United States Patent [19]
Cobb et al.

[11] 3,744,256
[45] July 10, 1973

[54] FLUID TRANSFER

[76] Inventors: Malcolm Carnie Cobb; Trevor Raymond White, both of c/o ICI Fibres Limited, Pontypool, England

[22] Filed: Mar. 20, 1972

[21] Appl. No.: 236,181

Related U.S. Application Data

[63] Continuation-in-part of Ser. No. 869,353, Oct. 24, 1969.

[30] Foreign Application Priority Data
Oct. 31, 1968  Great Britain................... 51,733/68

[52] U.S. Cl.................................... 61/13, 239/145
[51] Int. Cl........................................... E02b 13/00
[58] Field of Search........................... 61/11, 12, 13; 239/145, 450, 547

[56] References Cited
UNITED STATES PATENTS

| | | | |
|---|---|---|---|
| 1,254,906 | 1/1918 | Henderson...................... | 239/145 X |
| 2,807,505 | 9/1957 | Weitzel............................... | 61/12 X |
| 3,426,544 | 2/1969 | Curtis..................................... | 61/13 |
| 3,521,821 | 7/1970 | Emsbach............................. | 239/145 |

Primary Examiner—David J. Williamowsky
Assistant Examiner—David H. Corbin
Attorney—Cushman, Darby & Cushman

[57] ABSTRACT

Methods and systems of irrigation in which fluid is distributed via buried porous conduits to utilize conduits of non-woven fibrous material the porosity of which varies along the length of the conduits.

8 Claims, 3 Drawing Figures

PATENTED JUL 10 1973 3,744,256

FLUID TRANSFER

This is a continuation-in-part of application Ser. No. 869,353 filed Oct. 24, 1969.

The present invention relates to the transfer of fluids and more particularly to the controlled underground transfer of liquids using porous conduits.

In the conventional channel transfer of water for irrigation purposes, problems arise which may roughly be put into at least one of two categories, namely, those common to irrigation as such, e.g. avoiding uneven irrigation — in practice, land near to a water source tends to be more effectively irrigated than land further away, preventing the partial or possibly complete blocking of channels through silting, which in turn adds to the difficulty of maintaining a correct channel gradient to induce even flow, and those which may be attributed to the prevailing climatic conditions, e.g., in hot climates, the high rate of evaporation from exposed water.

To some degree these and other problems have been met by the simple expedient of using conduits which may either be laid on the surface of the ground or buried beneath it or both, for carrying water to the irrigation area. Thus, so long as the conduit remains intact, there is no immediate problem of silting, evaporation and to some extent, uneven distribution. However, once water is released in the irrigation area, the original problems, albeit to a lesser extent, return.

In the present invention, the Applicants have sought to overcome the problems associated with conventional methods of irrigation by employing, for the purpose of distributing water in an area to be irrigated, a flexible continuously porous conduit, which is buried in the ground and from which water can escape directly into the surrounding earth.

Accordingly, the present invention provides a method for controlling the rate of transfer of fluid between a source thereof and land by placing the fluid in a conduit with continuously porous walls which is buried in the land.

The preferred form of the present invention comprises a buried flexible non-rigid conduit constructed of non-woven fibrous material and defined by a continuously porous wall the porosity of which varies along its underground length so that controlled seepage of fluid may take place, said continuous porosity being achieved by a continuous uninterrupted variation in the compaction of the fibers of the conduit throughout its underground length, and means for connecting said conduit to a source of the fluid to be distributed.

Thus, the following advantages accrue from the use of a buried porous conduit, where the porosity of its walls is varied along its underground length; if sufficiently rigid and well constructed, the conduit will remain in the ground uncrushed and undamaged for long periods of time, and is thus eminently suitable for use in conjunction with modern "no-plough" agricultural techniques; by suitable conduit construction fluids may be distributed and metered to different underground points in pre-determined quantities; due to the continuous nature of its porous structure, the diffusion of liquids through the walls of the conduit will not be unduly interrupted by soil particles or by plant roots or give rise to appreciable erosion of surrounding soil; and as open distribution of liquid and thus direct evaporation thereof is avoided, in areas with adequate sunshine but where plant growth is normally retarded by lack of water, more than one harvest of some crops may be possible each year.

Variable porosity in a fibrous vessel is achieved by needle-punching techniques, or by the use of bicomponent fibers where one component is potentially adhesive as described in U.S. Pat. No. 3,511,747 incorporated herein by reference.

Further, despite the manner in which the conduit may have been fabricated, its flow profile can be varied by coating external areas with fluid impervious materials, e.g. in the case of water, polyvinyl acetate emulsion has been successfully employed with conduits comprising fibers derived from polyhexamethylene adipamide.

Obviously, such fibrous constructions mean that a wide range of materials both as staple fibers and continuous filaments may be used, for example, natural fibers such as cotton, regenerated natural fibers such as those derived from cellulose acetate and viscose, synthetic fibers such as those derived from polyacrylics, polyamides, polyesters, polyethers, polyolefines and polyvinyls and inorganic fibers such as glass.

Though the present invention has been discussed above principally in terms of the distribution of a liquid such as water, the invention is equally applicable to the distribution of fertilizers in liquid form and to gases. The optimum location of the conduit of this invention in respect to any plant life that is to be served will, of course, depend upon the nature of the plants and their natural environment, and may be easily determined by simple experiment.

The conduit wall is produced with a continuous uninterrupted variation in the compaction of the fibers of the wall throughout its underground length. This characteristic is produced by varying the degree of needle punching, or in the case of making the product with potentially adhesive bicomponent fibers, by varying the degree of pressure during the fiber bonding operation.

In general, the present invention may be exploited in at least one of two systems, or by a suitable combination of these systems. In a so-called dead-end system a porous conduit is branched from a non-porous supply conduit and is sealed at the remote end. In order to achieve an even flow of fluid through the walls of the conduit over the whole length of the branch, porosity must be at its lowest near the distribution main and at its highest at the remote end.

In a so-called ring system fluid flows continuously through a porous conduit eventually returning to a supply reservoir. If the amount of fluid diffusing through the walls of the conduit is very small in comparison with the total flow, then there will be no significant drop in fluid pressure through the circuit.

IN THE DRAWINGS

Figure 1:
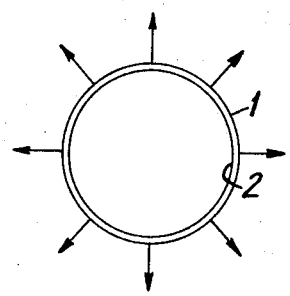
FIG. 1 is a schematic cross sectional view of a conduit embodying the principles of the invention.

In FIG. 1 there is shown a conduit having a continuous porous wall 1 constructed of non-woven fibrous material and having a thin inner lining of fluid permeable plastic material 2. Controlled seepage of fluid from the conduit takes place in any or all of the directions indicated by the arrows depending upon the compaction of the fibers of the porous wall.

Figure 2:
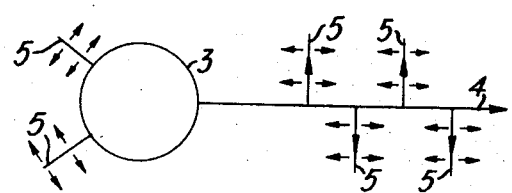
FIGS. 2 and 3 are schematic plan views of irrigation systems utilizing the conduit of FIG. 1.

FIG. 2 illustrates the dead-end system wherein a reservoir 3 and a non-porous supply conduit 4 feed a plurality of porous conduits 5. The outer ends of the conduits 4 and 5 are sealed. Fluid flow through the conduits 5 is as indicated by the arrows, with controlled seepage of fluid from the porous conduits 5 taking place in any or all of the directions shown depending upon the compaction of the fibers of the conduit wall.

Figure 3:
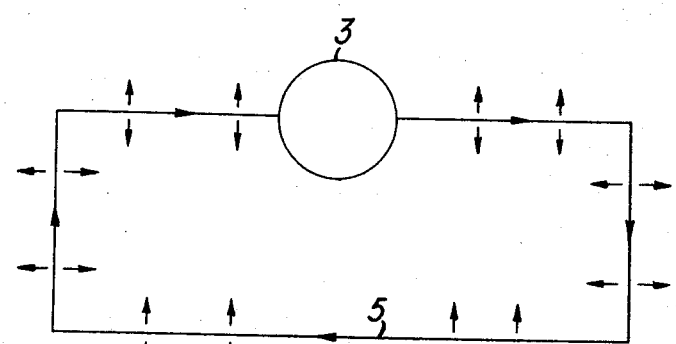

FIG. 3 illustrates the ring system in which there is a continuous loop of porous conduits 5 leading from and returning to the reservoir 3, the seepage of fluid from the conduit 5 being indicated by the arrows. Any suitable pump means (not shown) may be provided for producing fluid flow through the conduit 5.

The Applicants have found no difficulty in meeting a peak tropical transpiration rate of the order of 1 cm per day with the method and system of their invention, and by distributing sodium chlorate solution through buried conduits according to the present invention, have demonstrated, by the destruction of surface vegetation, the feasibility of the system to distribute a fluid throughout a soil bed.

What is claimed is:

1. A method for transferring a fluid between a source thereof and land comprising: burying in the land a flexible, non-rigid conduit constructed of non-woven fibrous material and having a continuously porous wall the porosity of which varies along its underground length so that controlled seepage of fluid may take place, said continuous porsity being achieved by a continuous uninterrupted variation in the compaction of the fibers of the conduit throughout its underground length; and connecting said conduit to the source of fluid whereby fluid escapes through the wall into the land.

2. A method as in claim 1 wherein the porosity of the conduit increases from one end toward the other end, and wherein said other end is sealed and said one end is connected to the source.

3. A method as in claim 1 wherein the fluid to be distributed flows continuously from the source through the porous conduit and back to the source.

4. In a sub-surface system for distributing fluid into the ground, a buried flexible, non-rigid conduit constructed of non-woven fibrous material and defined by a continuously porous wall the porosity of which varies along its underground length so that controlled seepage of fluid may take place, said continuous porosity being achieved by a continuous uninterrupted variation in the compaction of the fibers of the conduit throughout its underground length, and means for connecting said conduit to a source of the fluid to be distributed.

5. A system as in claim 4 including a source of fluid to be distributed and wherein the porous conduit is supplied at one end with the fluid and has its other end sealed, the porosity of the conduit increasing from said one end toward said other end.

6. A system as in claim 4 including a source of fluid to be distributed and wherein said porous conduit is connected at both ends to the source.

7. A system as in claim 4 wherein a portion of the porous conduit is coated externally with fluid-impervious material.

8. A system as in claim 4 wherein said porous conduit is internally lined with a fluid permeable material.

* * * * *